Patented Jan. 5, 1932

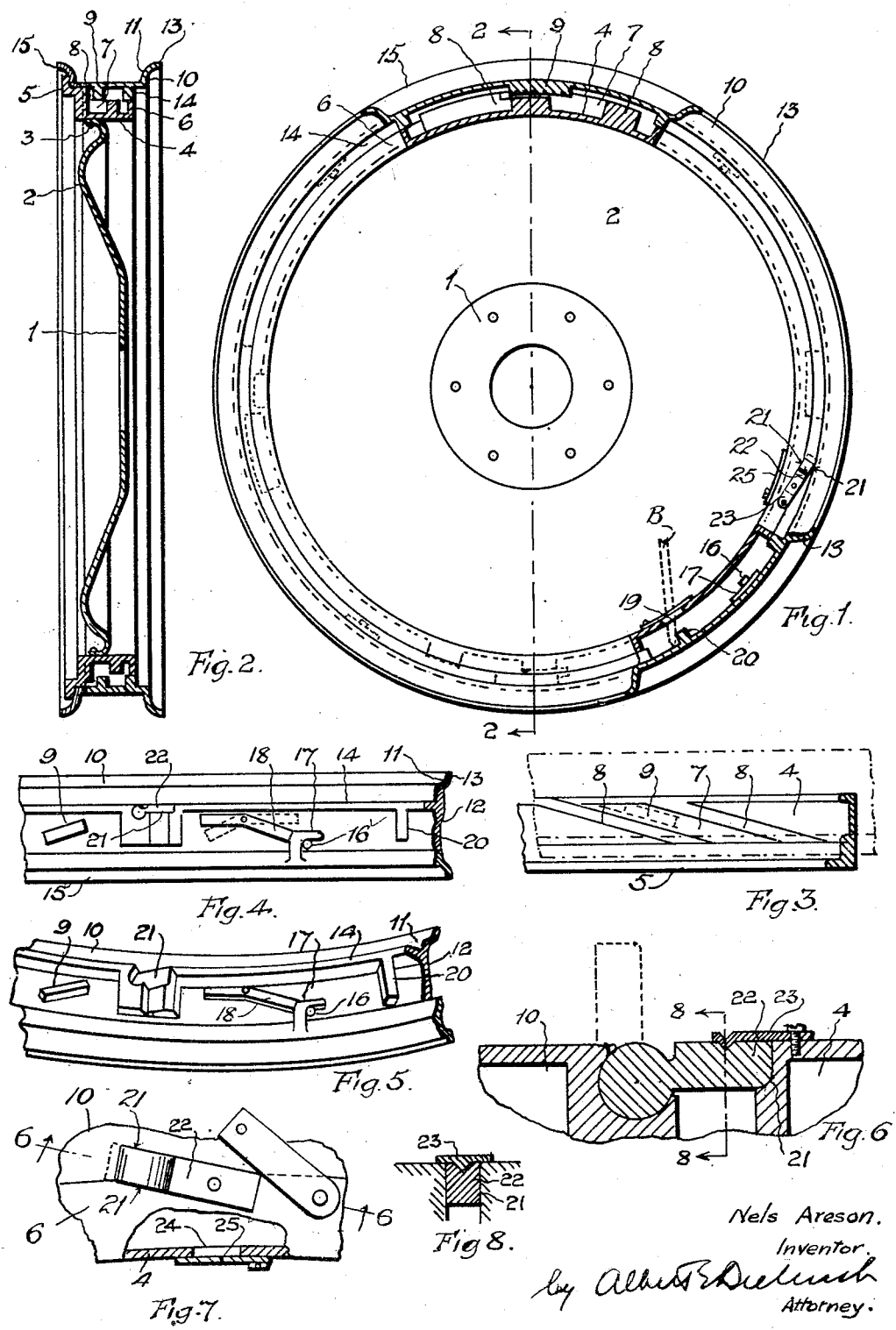

1,839,942

UNITED STATES PATENT OFFICE

NELS ARESON, OF PORTLAND, OREGON, ASSIGNOR TO NORTHERN IMPLEMENT MANUFACTURING COMPANY, OF KING COUNTY, WASHINGTON

AUTOMOTIVE WHEEL

Application filed September 4, 1928. Serial No. 303,779.

My invention relates to demountable rims for automotive wheels and to removable metallic tires for metal felloe wheels, and provides simple means for the removal of the rim and tires from the wheel.

The invention in its preferred embodiment consists of a two-piece rim element adapted to coast with each other, one of which is relatively fixed to the wheel and the other being adapted to partial rotation relative to the felloe and during such rotation to be tightened or loosened relative thereto so that a locking engagement is maintained or broken between the felloe and the rim structure; simple means being provided for the partial rotation of the rim relative to the felloe by a short bar.

The rim is secured to the felloe by a locking wedge inserted in an aperture formed in and between the inner periphery of the rim and the wheel felloe, one half of the aperture being formed in the rim and the other half in the felloe. The rim is rotated and tightened upon the felloe by use of the short bar until the two halves of the aperture are in precise alignment to permit the insertion of the locking wedge which is prevented from working out by a cover spring provided on the underside with a pressed protrusion fitting a corresponding recess in the head of the wedge.

A further object of my invention is to effect a more simplified construction, and one that is adapted to all forms of automotive wheels, either of the disc or artillery type, to enable the removal of rims or tires with greater facility and more speedily, and without the use or removal of threaded elements of any kind.

Heretofore in devices of this kind it has been the general practice to maintain the rim in tight working relationship with that of the wheel felloe by threaded elements of various forms. The removal of the same can only be accomplished by the unthreading of the threaded elements by wrenches of various type. This requires a substantial amount of time and physical effort to accomplish the result. With my new and improved construction no threaded elements are required. The same results may be easily and quickly accomplished through the use of a simple locking wedge adapted to be inserted within an aperture in the oppositely disposed surfaces of the elements to be locked together.

A further object of my new and improved device resides in economy of construction with interchangeable parts provided.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In these drawings—

Fig. 1 is a side elevational view of the invention partly fractionated.

Fig. 2 is a section taken on the line 2—2 of Fig. 1.

Fig. 3 is part of the felloe showing inclined guides for securing the felloe and tire rim.

Fig. 4 is an inside view of the tire rim.

Fig. 5 is an inside view of the tire rim in perspective.

Fig. 6 is a section taken substantially on the line 6—6 showing method of locking felloe and tire rims.

Fig. 7 is a plan of the locking device with spring cover removed.

Fig. 8 is a section on the line 8—8 of Fig. 6.

In preferred embodiment I preferably form my wheel structure as a one piece disc member having a central hub 1, sides 2 and a turned edge 3 to which the felloe 4 is riveted. A peripheral flange 5 is disposed upon one side of the felloe and the opposite flange 6 of the felloe is of smaller diameter to that of the flange 5.

Disposed around the outer periphery of the felloe and between the flanges 5 and 6 are a number of locking grooves 7 angularly inclined and formed by spaced apart bars 8 secured in between the flanges. The locking grooves 7 each have an inclined surface upon which the angular locking lugs 9 on the inner periphery of the rim 10 are made to engage.

I do not wish to be limited to any specific number of locking elements, as the number will depend upon the weight of the car with which the same is to be used and the diameter of the wheel, as it will be apparent that the heavy duty truck will require a modified structure to that of the light pleasure car.

The rim 10 is adapted to the felloe of the wheel and is made to engage upon its one side with that of the peripheral flange 5 of the wheel member. The rim 10 may be made in two pieces and provided with a removable element 11 having a central portion 12, one side of which upwardly extends into a tire flange 13 and on the inner periphery is disposed an extended flange 14 engaging with the flange 6 of the felloe when in place.

The inner wall of 12 is made to engage with the opposite rim flange section 15 which contacts with the peripheral flange 5 of the wheel. The rim sections are secured together by a plurality of locking pins 16 disposed upon the inner surface of the removable element 11 of the rim 10 which pins are made to engage the locking lugs 17 of the opposite rim section, as shown in Figs. 4 and 5, wherein a section of the rim is shown assembled.

The lugs 17 are prevented from backing off the pins 16 by the lever 18 contacting the back of the lugs 17. Figs. 4 and 5 show this.

To disassemble the rim only requires the moving of the lever 18 to the "off" position and a partial rotation of the rim element 13 to permit the separation of the rim sections 13 and 15.

The rim is secured to the wheel by mounting it upon the felloe and circumferentially rotating it until the lugs 9 of the rim are in full engagement with the locking grooves 7 of the felloe. It is then tightened by the use of a short bar B inserted through a hole 19 in the felloe of the wheel and the end of the bar is made to contact the lug 20 formed on the inner periphery of the rim 10 enabling the rim to be pried around upon the felloe until two halves of an aperture 21 cut respectively in the flange 6 of the felloe 4 and the flange 14 of the rim 10 are in exact alignment.

The rim 10 is then locked upon the felloe 4 by the insertion of a locking wedge 22 in the aperture 21. The locking wedge 22 is prevented from working out of the aperture 21 by provision of a cover spring 23 as shown in Fig. 6, which also shows in elevational section the locking wedge 22.

Figure 8 shows in section the wedge 22 and cover spring 23. Figure 7 shows the two halves of the aperture 21 in exact alignment and the wedge 22 in place.

To remove the wedge 22 there is provided a hole 24 in the side of the felloe to permit the insertion of a small bar to pry out the wedge. This hole is fitted with a cover plate 25, as shown in Fig. 7.

While the form of mechanism herein described is admirably adapted to fulfil the objects primarily stated, it is to be understood that it is not intended to confine the invention to the one form of embodiment herein shown and described, as it is susceptible of embodiment in various forms, within the scope of the claims which follow.

Having now particularly described my invention what I claim is:

1. A wheel having a radially outwardly flanged felloe, a rim having a radially inwardly projecting flange to cooperate with the felloe flange, said flanges each having one-half of an aperture, which halves when in alignment will constitute a wedge receiving aperture, a locking wedge pivotally held in one of the halves of said aperture and adapted to be moved into the other half of the same, and a member pivotally secured to said felloe and adapted to overlie said wedge to retain it in place, and means securing said rim to said felloe by circumferential movement in respect thereto.

2. A wheel having a radially outwardly flanged felloe, a rim having a radially inwardly projecting flange to cooperate with the felloe flange, said flanges each having one-half of an aperture, which halves when in alignment will constitute a wedge receiving aperture, a locking wedge pivotally and removably held in one of the halves of said aperture and adapted to be moved into the other half of the same, and a cover spring secured to said felloe and adapted to overlie said wedge to retain it in place, and means securing said rim to said felloe by circumferential movement in respect thereto.

In testimony whereof I affix my signature.

NELS ARESON.